United States Patent [19]
Huggins et al.

[11] Patent Number: 5,212,749
[45] Date of Patent: May 18, 1993

[54] OPTICAL FIBER MOUNT

[75] Inventors: Raymond W. Huggins, Mercer Island; Omer C. Helfer, Black Diamond, both of Wash.

[73] Assignee: The Boeing Company, Seattle, Wash.

[21] Appl. No.: 808,630

[22] Filed: Dec. 17, 1991

[51] Int. Cl.[5] .................................. G02B 7/26
[52] U.S. Cl. ............................................. 385/62
[58] Field of Search ............................. 385/60–64

[56] References Cited

U.S. PATENT DOCUMENTS

| | | |
|---|---|---|
| 269,708 | 10/1882 | Read . |
| 2,161,718 | 6/1938 | Miller .................................. 248/182 |
| 3,441,222 | 4/1967 | Law .................................. 239/280.5 |
| 3,519,236 | 8/1967 | Schmidt et al. ..................... 248/181 |
| 3,588,232 | 12/1969 | Mostel .................................. 350/288 |
| 3,912,918 | 10/1975 | Feinbloom ............................ 240/1.4 |
| 3,947,139 | 3/1975 | Feinbloom ............................ 403/90 |
| 4,087,158 | 5/1978 | Lewis et al. ........................ 350/96.21 |
| 4,101,198 | 7/1978 | Heldt .................................. 350/96.20 |
| 4,188,681 | 2/1980 | Tada et al. ............................ 14/16.1 |
| 4,368,949 | 1/1983 | Schmidt et al. .......................... 385/64 |
| 4,497,536 | 2/1985 | Payne et al. ............................ 385/64 |
| 4,573,760 | 3/1986 | Fan et al. ............................ 385/62 X |
| 4,746,188 | 5/1988 | Loffler ................................ 350/96.20 |
| 4,781,429 | 11/1988 | Cartier ................................ 350/96.20 |
| 5,095,517 | 3/1992 | Monguzz et al. .................... 385/62 X |

Primary Examiner—Akm E. Ullah
Attorney, Agent, or Firm—Jones, Tullar & Cooper

[57] ABSTRACT

An optical fiber mounting device is shown which assembles the optical fiber in a ferrule which is inserted in a spherical member. The spherical member is then assembled in a spherical housing cavity and clamped by conventional means. To allow for vertical adjustment of the fiber, a spherical member may be slotted allowing sliding engagement of the ferrule. The ferrule is clamped in place when the slots are closed by the clamping action of the housing.

6 Claims, 2 Drawing Sheets

5,212,749

OPTICAL FIBER MOUNT

BACKGROUND OF THE INVENTION

This invention relates in general to means for mounting optical fibers and in particular a means for mounting optical fibers which is adjustable in translation and in the vertical plane to allow precise and accurate mounting of the fiber.

Optical systems which include optical fibers have the requirement that the fiber must be precisely aligned with respect to the other optical components in order to optimize the performance of the device. In the prior art devices, the fibers are often cemented in place after alignment. In this condition, the fiber may not be adjusted after assembly. Other devices which allow for adjustment of the fiber are known. However, these devices are cumbersome in adjustment method and it is difficult to maintain the fiber in precise alignment during the operation of the device. It is desirable to have a fiber mounting means which is easily adjustable in three axes, and allows a replacement of the fiber and quick and easy alignment.

SUMMARY OF THE INVENTION

The present invention overcomes the disadvantages of the prior art by providing a simple, mechanical means for mounting an optical fiber in a sensing device, which is adjustable during the operation of the device and provides multi axis adjustment. The same mounting method disclosed in this invention may also be used for coupling two optical fibers and assuring precise alignment of the fibers in the coupling.

The apparatus of this invention uses a simple, spherical mounting surface assembled in a spherical cavity and clamped together by a threaded locking means. The fiber to be aligned is enclosed in a ferrule member which is inserted in a diametral hole in the spherical ball. The ferrule member supports the fiber securely and additionally, provides a handle means for adjusting the location of the fiber by rotating or tilting the ferrule about the spherical surface. Where the fiber is of sufficient diameter, a ferrule may not be necessary and the fiber can serve as its own support in the assembly. In a coupling device utilizing the invention, two spherical cavities are formed with spherical ball member facing each other and clamped securely in an axial housing while allowing adjustment of the fibers before final locking is achieved.

BRIEF DESCRIPTION OF THE DRAWINGS

FIG. 2b is an alternate assembly method for the device of FIG. 2a.

DETAILED DESCRIPTION OF THE INVENTION

Figure 1:
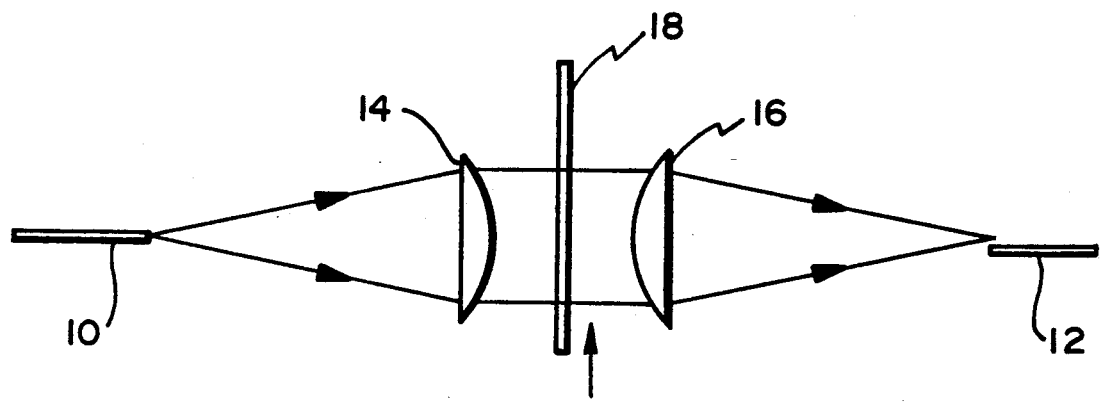
FIG. 1 is a schematic of a typical sensor using optical fiber transmission.

Referring now to FIG. 1, there is shown a schematic drawing of a typical sensor utilizing optical fibers for signal transmission. The input fiber 10 carries an input signal to the device through lenses 14 and 16 and then to the output fiber 12. Between lenses 14 and 16, there is inserted for example, a variable density filter 18 which is movable in the vertical direction. In the operation of such a device, the input signal from the fiber 10 is focused by the lens system through the variable filter and the output is sensed by fiber 12. As the filter 18 is moved vertically, the magnitude of the signal received by fiber 12 is varied in accordance with the vertical position of the filter. As is apparent from this description, misalignment of the fibers 10 and 12 as shown in FIG. 1, will materially degrade the signal output of the device.

Figure 2A:
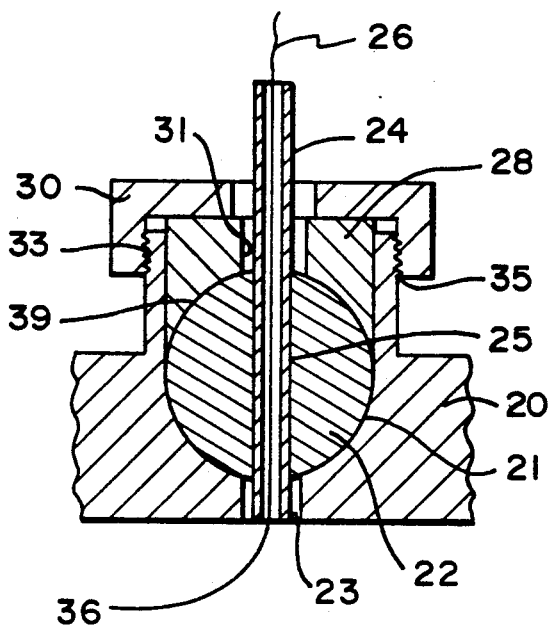
FIG. 2a is a cross sectional view of the assembled device.

Referring now to FIG. 2a, there is shown a cross sectional view of a device utilizing the invention. The device consists of a base housing member 20 having a spherical cavity 21 in its interior. The cavity is hemispherical at the bottom and cylindrical at its upper portion. Seated in the cavity 21 is a spherical member 22 providing the principal mounting means for the fiber. The spherical member 22 has a diametral hole 25 extending through its diameter. Inserted in the hole 25 is a ferrule member 24. The ferrule is inserted in the spherical member 22 such that its lower end is approximately even with the bottom surface of the housing 20. The portion of the ferrule extending through the sphere protrudes through opening 23 in the bottom of the housing. In this embodiment, the ferrule member is a tight-fit within the sphere. The fiber 26 is inserted in the ferrule member and secured such that its end is flush with the bottom end of the ferrule.

Inserted in the cylindrical portion of the cavity 21 in the housing 20 is a clamping member 28. This member is cylindrical in shape but having a hemispherical surface 29 at its lower end. This spherical surface is designed to mate with the surface of the sphere 22. The clamping member 28 has an opening 31 through its body to accommodate the ferrule 24. To complete the assembly, a locking collar 30 has an opening for accepting the ferrule member in its center and a threaded portion 33 on its interior surface. The threads 33 mate with threads 35 on the housing member 20.

To assemble the device, the spherical member with the ferrule inserted is placed in the cavity 21 of the housing 20. The clamping collar 28 is inserted over the ferrule and the locking collar 30 threaded loosely to the body of the device. The locking collar 30 may be screwed down forcing the clamp 28 to engage the sphere 22. The clamping force may be lightly applied at first and the spherical member may be adjusted by utilizing the ferrule 24 to rotate the ball 22. As can be seen, rotation of the ball tilts the ferrule 24 with respect to the longitudinal axis of the housing as indicated by directional arrows 27, moves the fiber end 36 in a plane perpendicular to the axis of the housing to precisely align it with respect to the housing.

Figure 2B:
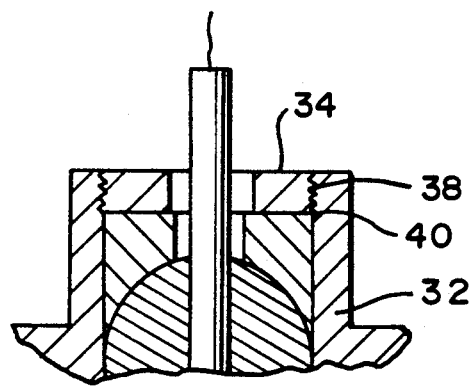

Referring now to FIG. 2b, an alternate form of the embodiment described in connection with FIG. 2a is shown. In this embodiment, the locking collar 30 is replaced by an internal collar 34 having external threads 38. These external threads engage internal threads 40 provided in the internal cylindrical surface of the housing 32. The assembly of this embodiment is then the same as that provided in connection with FIG. 2a above.

Figure 3:
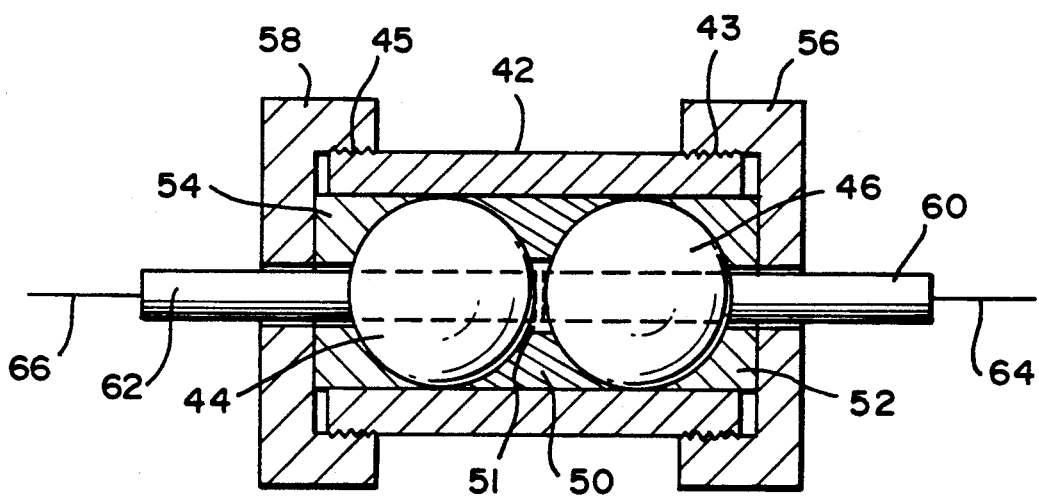
FIG. 3 is a cross sectional view of an optical fiber coupler utilizing the invention.
Figure 4:
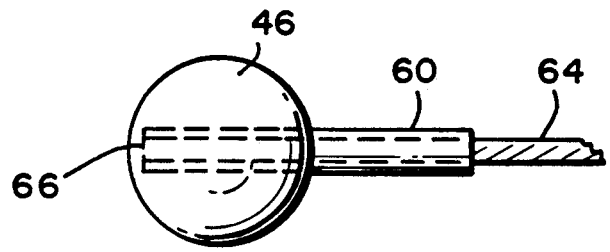
FIG. 4 is a detailed view of the fiber mounting method of FIG. 3.

Referring now to FIG. 3, there is shown an application of the invention to form a coupling device for accurately coupling two optical fibers to each other. Again, the accuracy of alignment of the fibers will determine the efficiency of the coupling. The coupling device is comprises a cylindrical housing member 42 having external threads 43 and 45 at each end thereof. Two spherical cavities are formed within the housing 42 by means of three insert members 50, 52 and 54. The central ring 50 has a cylindrical outer surface with spherical surfaces on its axial ends. A central hole 51 provides a means for optically connecting the fibers. The end rings 52 and 54 are similar to the middle ring 50, however, they have only a single spherical surface on one end with a flat surface at the other end for mating with the locking device. As described in connection with FIGS. 2a and 2b above, the fibers 64 and 66 are inserted in ferrule members 60 and 62 which are inserted into spherical members 44 and 46. The spherical members 44 and 46 are assembled against the ring 50, the rings 52 and 54 assembled behind them, and the locking rings 56 and 58 are then threaded onto the housing member 42. The locking members can be lightly tightened and the ferrule members 60 and 62 moved until the fibers 64 and 66 are in correct alignment. The locking collars are then tightened securely and the coupling is completed. Referring now to FIG. 4, the method of attaching the fiber to its spherical member is shown. The fiber 64 is inserted in the ferrule 60, but the ferrule member does not extend through the body of the sphere 46. As can be seen, the ferrule member 60 stops just before the lower surface of the sphere 46 and allows the fiber 64 to pass through a hole 66 of fiber diameter at the base of the sphere 46. The end of the fiber can then be polished to form an appropriate optical surface for mating with the other fiber members.

Figure 5:
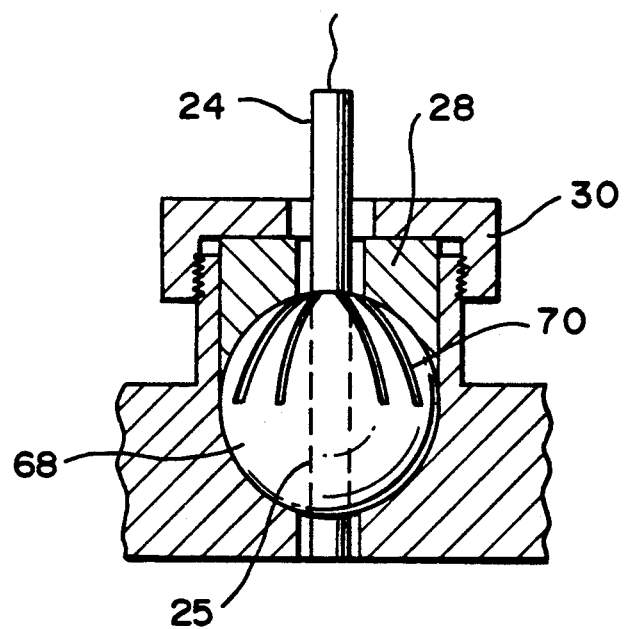
FIG. 5 is an alternate method of forming the spherical ball having a slotted upper surface.

Referring now to FIG. 5, there is shown an alternate means of mounting the ferrule member which will allow for vertical adjustment of the fiber as well as translational adjustment. In this embodiment the sphere 68 is provided with a series of slots 70 extending from the surface of the sphere to the diametral opening 25 provided for the ferrule 24. In this embodiment, the ferrule 24 may be moved vertically through the sphere 68 until the proper vertical position has been obtained. When the clamping member 28 is forced against the sphere by the locking collar 30, the slots 70 are closed by the clamping pressure and grip the ferrule in the same manner as a collet ordinarily used for holding tools.

Thus, it can be seen that there is described by this invention a means for mounting optical fibers which provide precise adjustable alignment of optical fibers. Additionally, the device provides with adjustment in three axes if desired. Additionally, the device may be used to assemble an optical fiber coupling device with precision adjustment means.

What is claimed is:

1. An optical fiber mounting device comprising:
   a housing having a cylindrical portion at one end with external threads formed thereon and having a spherical cavity therein and an outlet opening in the bottom of said cavity;
   a spherical fiber mounting member assembled in the spherical cavity in said housing and having a diametral hole therethrough for receiving an optical fiber in alignment with the outlet opening in the bottom of the spherical cavity in said housing; and
   clamping means for releasably clamping said fiber mounting means in the spherical cavity in said housing, said clamping means having internal threads at one end for engaging the external threads on said housing whereby said clamping means engages the spherical fiber mounting means when said clamping means is threaded onto said housing.

2. An optical fiber mounting device according to claim 1, wherein said spherical member is provided with a series of radial slots therein extending from the outer surface of said spherical member to the diametral hole in said spherical member.

3. An optical coupling device comprising: a housing having an opening therethrough;
   first and second spherical cavities formed at opposite ends of the opening in said housing, each of said cavities having an opening in its outer end;
   first and second spherical fiber mounting members inserted in the spherical cavities in said housing, said fiber mounting members each having openings therethrough in alignment with each other for receiving optical fibers;
   means for adjusting said spherical fiber mounting members for aligning the openings therein to place said optical fibers in optimum light transmitting relationship; and
   clamping means for securing said fiber mounting members in said housing when said optical fibers are in optimum light transmitting relationship.

4. An optical coupling device according to claim 3 wherein said spherical fiber mounting members have slots provided in their outer surfaces, said slots extending from the outer surface of said fiber mounting members through said mounting member to intersect with the first diametral hole.

5. An optical fiber coupling device comprising:
   a cylindrical housing member having a cylindrical opening therethrough along a central axis;
   a central retaining ring assembled in the center of the opening in the housing member, said ring having a spherical opening at each opposite axial end;
   first and second end ring members inserted in the open ends of said housing member, said end ring members having facing spherical surfaces at their internal surfaces;
   first and second spherical fiber mounting members inserted in the spherical cavities formed by the central ring and the end rings, said mounting members each having a first diametral hole extending along said central axis from its outer surface a substantial distance through the mounting member and having a second diametral hole aligned with said first diametral hole extending from the bottom of the first diametral hole through the inner surface of each spherical member;
   first and second clamping rings, one at each end of said housing means for compressing the ring members and the spherical members axially to form a compact assembly; and
   first and second ferrule members inserted in said first diametral hole in each of said spherical fiber mounting members for holding first and second optical fibers in optical transmitting relationship.

6. An optical coupling device according to claim 5, wherein said spherical fiber mounting members have slots provided in their outer surfaces, said slots extending from the outer surface of said fiber mounting members through said mounting member to intersect with the first diametral hole.

* * * * *